United States Patent [19]
Reusser et al.

[11] 3,833,475
[45] Sept. 3, 1974

[54] PROCESS FOR PREPARING LINCOMYCIN
[75] Inventors: Fritz Reusser; Alexander D. Argoudelis, both of Portage, Mich.
[73] Assignee: The Upjohn Company, Kalamazoo, Mich.
[22] Filed: Apr. 23, 1973
[21] Appl. No.: 353,379

[52] U.S. Cl............................................... 195/80 R
[51] Int. Cl............................................... C12d 9/00
[58] Field of Search.................................. 195/80 R

[56] References Cited
UNITED STATES PATENTS
3,697,380  10/1972  Argoudelis et al................ 195/80 R Primary Examiner—A. Louis Monacell
Assistant Examiner—Robert J. Warden
Attorney, Agent, or Firm—Roman Saliwanchik

[57] ABSTRACT

Microbiological process for preparing the antibiotic lincomycin at high incubation temperatures using the micro-organism *Streptomyces espinosus* and biotypes thereof.

8 Claims, No Drawings

PROCESS FOR PREPARING LINCOMYCIN

BACKGROUND OF THE INVENTION

As disclosed in U.S. Pat. No. 3,086,912, the antibiotic lincolnens in (lincomycin) can be produced by the micro-organism S. lincolnensis var. lincolnensis, NRRL 2936, at an incubation temperature of 18°–40° C., and preferably at a temperature of 26°–30° C. U.S. Pat. No. 3,697,380 discloses the fermentation production of lincomycin using the micro-organism S. espinosus Dietz, sp. n., NRRL 3890. Again the incubation temperature disclosed for the production of lincomycin is 18°–40° C.

In conducting the above fermentations, it is necessary to use a large amount of cooling water in most fermentation equipment to maintain the desired fermentation temperature. Further, the maintenance of a temperature within the range of 18°–40° C., though essential for antibiotic production as disclosed above, is conducive to the development and proliferation of contaminating microorganisms in the fermentation vessel.

BRIEF SUMMARY OF THE INVENTION

We have discovered that the microorganism S. espinosus Dietz, sp. n., NRRL 3890, and certain biotypes thereof, can produce significantly higher amounts of lincomycin at a fermentation incubation temperature ranging from about 44° C. to about 48° C., and preferably at a temperature of 45° C., than at 28° C. A comparison of the fermentation yields at 45° C. and 28° C. for the microorganisms of the subject invention is shown in the following Table A.

comycin at a temperature of about 45° C. are Streptomyces pseudogriseolus chemovar linmyceticus, NRRL 3985, and Streptomyces variabilis chemovar liniabilis, NRRL 5618. Thus, the capability of S. espinosus and its biotypes as disclosed herein to produce lincomycin at an incubation temperature of about 44°–48° C. is totally unexpected.

A distinct advantage in using these microorganisms to prepare lincomycin, in addition to the higher fermentation yields of lincomycin shown in Table A, is the need for less fermentor cooling capacity. The need for less cooling capacity is especially significant in high temperature climates and in areas having limited water supplied since water is the generally used means for cooling and maintaining fermentation temperatures.

DETAILED DESCRIPTION OF THE INVENTION

1. The Microorganism

The novel actinomycetes used according to this invention for the production of lincomycin are Streptomyces espinosus, NRRL 3890, and three biotypes thereof. One of the strain characteristics of these microorganisms is the production of lincomycin at an incubation temperature range of about 44°–48° C. A subculture of these living micro-organisms can be obtained upon request from the permanent collection of the Northern Regional Research Laboratories, Agricultural Research Services, U.S. Department of Agriculture, Peoria, Ill., U.S.A. In addition to the above NRRL number, the accession numbers of the S. espinosus biotypes are NRRL 5729, NRRL 5730, and NRRL 5731.

TABLE A

Production of Lincomycin by Thermoduric S. espinosus Strains

| Biotype | Temp. | Day | pH | Lincomycin $\mu$g/ml* | | Temp. | Day | pH | Lincomycin $\mu$g/ml* |
|---|---|---|---|---|---|---|---|---|---|
| 22,149a | 28C | 1 | 7.7 | 0 | S. espino- | 28C | 1 | 7.8 | 2 |
|  |  | 2 | 8.7 | 7 | sus |  | 2 | 8.8 | — |
| NRRL 5731 |  | 3 | 9.0 | 9 | NRRL 3890 |  | 3 | 8.9 | 8 |
|  |  | 4 | 9.0 | 23 | (type culture) |  | 4 | 9.0 | 17 |
|  |  | 5 | 9.0 | 38 |  |  | 5 | 9.1 | 23 |
|  | 45C | 1 | 8.6 | 17 |  | 45C | 1 | 8.8 | 13 |
|  |  | 2 | 9.2 | 24 |  |  | 2 | 8.7 | 7 |
|  |  | 3 | 9.0 | 60 |  |  | 3 | 8.8 | 59 |
|  |  | 4 | 8.8 | 60 |  |  | 4 | 8.5 | 95 |
|  |  | 5 | 8.8 | 110 |  |  | 5 | 8.3 | 147 |
| 21,987a | 28C | 1 | 8.1 | 2 | 22,061a | 28C | 1 | 7.9 | Trace |
|  |  | 2 | 8.6 | 6 |  |  | 2 | 8.7 | 4 |
| NRRL 5729 |  | 3 | 9.0 | 2 | NRRL 5730 |  | 3 | 9.0 | 5 |
|  |  | 4 | 9.0 | 8 |  |  | 4 | 9.0 | 14 |
|  |  | 5 | 9.1 | 13 |  |  | 5 | 9.0 | 19 |
|  | 45C | 1 | 8.3 | 10 |  | 45C | 1 | 8.8 | Trace |
|  |  | 2 | 9.1 | 12 |  |  | 2 | 9.1 | 30 |
|  |  | 3 | 8.9 | 30 |  |  | 3 | 8.9 | 33 |
|  |  | 4 | 8.7 | 36 |  |  | 4 | 8.9 | 54 |
|  |  | 5 | 8.7 | 48 |  |  | 5 | 8.8 | 76 |

Standard bioassay for lincomycin (S. lutea = assay organism, diluent buffer = 0.1 M $PO_4$; pH 7.0, ATCC 9341, UC 130)
NOTE: All the fermentations used identical seed and fermentation media. The media and other seed and fermentation conditions are shown in Example 1, Infra.

The results shown in Table A are unexpected in view of prior knowledge of the production of lincomycin by S. espinosus. Also, our tests have shown that S. lincolnensis var. lincolnensis, NRRL 2936, does not produce lincomycin when incubated at a temperature of about 45° C. Other lincomycin-producing Streptomycetes which produce lincomycin at a normal incubation temperature range, i.e., 18°–40° C., but do not produce lin- The taxonomy of Streptomyces espinosus NRRL 3890 is disclosed in U.S. Pat. No. 3,697,380. This microorganism, and the biotypes, were studied and characterized by Alma Dietz of the Upjohn Research Laboratories.

DESCRIPTION OF THE MICROORGANISMS

Streptomyces espinosus biotpye 21987a, NRRL 5729.

*Streptomyces espinosus* biotype 22061a, NRRL 5730.
*Streptomyces espinosus* biotype 22149a, NRRL 5731.

1. Color characteristics

Aerial growth gray-green. Melanin-negative. Appearance on Ektachrome [Dietz, A. 1954. Ektachrome transparencies as aids in actinomycete classification. Ann. N.Y. Acad. Sci. 60:152–154.] is given in Table 1. Reference color characteristics are given in Tables 2 and 3. The cultures may be placed in the Green (GN) color series of Tresner and Backus [Tresner, H. D., and E. J. Backus. 1063. System of color wheels for streptomycete taxonomy. Applied Microbiol. 11:335–338.]

2. Microscopic characteristics

Sporophores short, straight to flexuous, to open spiral to spiral (RF, RA, S) in the sense of Pridham et al. [Pridham, T. G., C. W. Hesseltine, and R. G. Benedict. 1958. A guide for the classification of streptomycetes according to selected groups. Placement of strains in morphological sections. Applied Microbiol. 6:52–79]. Spores mostly spherical with many showing a distinct linkage. Spore surface thorny to spiny in the sense of Dietz and Mathews [Dietz, A., and J. Mathews. 1971. Classification of Streptomyces spore surfaces into five groups. Applied Microbiol. 21:527-533]. Some spines show a transition to hairy. Spines are profuse and show markings when observed on spores treated by the carbon replica method of Dietz and Mathews [Dietz, A., and J. Mathews. 1962. Taxonomy by carbon replication. I. An examination of *Streptomyces hygroscopicus*. Applied Microbiol. 10:258–263].

3. Cultural and biochemical characteristics

See Table 4.

Carbon utilization

Growth of the cultures on carbon compounds was determined in the synthetic medium of Pridham and Gottlieb [Pridham, T. G., and D. Gottlieb. 1948. The utilization of carbon compounds by some Actinomycetales as an aid for species determination. J. Bacterial. 56:52–79], Table 5 and in the synthetic medium of Shirling and Gottlieb [Shirling, E. B., and D. Gottlieb. 1966. Methods for characterization of Streptomyces species. Int. J. Syst. Bacteriol. 16:313–340], Table 6.

Temperature

Growth was fair at 18° C. and 55° C.; good at 24° C., and heavy at 28°–37° C. At 45° C. growth was fair (vegetative) in 24 hours and heavy (good sporulation) in 72 hours. The agar media used were Bennett's, Czapek's sucrose, maltose-tryptone, and Hickey-Tresner (modified).

Source

Soils from southeast Texas.

Type culture

*Streptomyces espinosus* Dietz sp. n., NRRL 3890.

Type variety

*Streptomyces espinosus* var. *espinosus* Dietz NRRL 3890.

DISCUSSION

An actinomycete culture, isolated in the Upjohn soil screening laboratory from a soil sample from southeast Texas was characterized as *Streptomyces espinosus* sp. n. in U.S. Pat. No. 3,697,380. Three additional soil isolates from southeast Texas soils had the same color pattern on Ektachrome as the type culture. In expanded studies the isolates were found to have the same sporophore and spore types as well as general cultural characteristics of the type culture. Outstanding characteristics of these cultures are their gray-green aerial growth, short sporophores bearing round spiny spores, and thermoduric growth. These cultures are not considered thermophiles because they grow at temperatures of about 18° C. whereas thermophiles usually do not grow at temperatures below 40° C. These new isolates, as well as the type culture produce lincomycin at 45° C. Differences in cultural characteristics (see tables) and antagonistic properties do not affect the significant criteria cited above and are not sufficient to warrant variety designation of these new isolates. Therefore, they are designated as biotypes in accordance with Rule 8, Recommendation 8a (3) Type ((It is recommended that the term biotype (or physiological type) be used for infra-subspecific forms based upon differences in physiological or biochemical characteristics.)) of the International Code of Nomenclature of Bacteria [International Code of Nomenclature of Bacteria. 1966. Edited by the Editorial Board of the Judicial Commission of the International Committee on Nomenclature of Bacteria. Intern. J. System. Bacteriol. 16:459–490]. The isolates are designated *Streptomyces espinosus* biotype 21987a, *Streptomyces espinosus* biotype 22061a, and *Streptomyces espinosus* biotype 22149a.

TABLE 1

Appearance of *Streptomyces espinosus* Cultures on Ektachrome

| Agar medium[a] | NRRL 3890 | NRRL 5729 | NRRL 5730 | NRRL 5731 |
|---|---|---|---|---|
| Bennett's | S Gray-green | Gray-green | White to gray-green | Gray-green |
| | R Pale yellow-tan | Pale yellow-tan | Pale yellow | Pale yellow-tan |
| Czapek's sucrose | S Gray-green | Gray-green | Gray-green | Gray-green |
| | R Pale gray | Pale gray | Pale gray | Pale gray |
| Maltose-tryptone | S Gray-green | Gray-green | Gray-green | Gray-green |
| | R Yellow-tan to olive | Yellow-tan to olive | Yellow | Yellow-tan |
| Peptone-iron | S White | White | White | White |
| | R Yellow | Yellow | Yellow | Yellow-tan |
| 0.1% Tyrosine | S Colorless | Colorless | Colorless | Gray-green |
| | R Red | Red | Red | Red |
| Casein starch | S Gray-green | Gray-green | Gray-green | Gray-green |
| | R Pale gray-green | Pale gray-green | Pale gray-green | Pale gray-green |

[a] S = surface; R = reverse

TABLE II

Reference Color Characteristics of *S. espinosus* Cultures

| Agar Medium[a] | | Color Harmony Manual, 3rd ed. 1948 (1)[b] | | | | NBS Circular 553, 1955 (2)[c] | | | |
|---|---|---|---|---|---|---|---|---|---|
| | | NRRL 3890 | NRRL 5729 | NRRL 5730 | NRRL 5731 | NRRL 3890 | NRRL 5729 | NRRL 5730 | NRRL 5731 |
| Bennett's | S | a<br>24½fe<br>1½ge | a<br>24½ih<br>1ge | a<br>24½ih | 24½fe | 263gm<br>122gm<br>109gm | 263gm<br>122m<br>127g<br>109gm | 263gm<br>122m<br>127g | 122gm |
| | R | 1½ca<br>2fb<br>2ec | 1½ca<br>2fb<br>2ec | 1½gc | 2ec<br>1½ec | 89gm<br>87g<br>89m<br>90gm | 89gm<br>87g<br>89m<br>90gm | 102g<br>105gm | 90gm<br>90gm<br>93m |
| | P | — | — | — | — | | | | |
| Czapek's sucrose | S | 1li<br>2ig | 1li<br>2ig | 2ig | 2ig | 110gm<br>110g | 110gm<br>112m | 110g<br>112m | 110g<br>112m |
| | R | 1ec<br>2ig | 1ec<br>2ig | 2fe | 1ec | 112m<br>121m<br>122g<br>110g<br>112m | 112m<br>121m<br>122g<br>110g<br>112m | 94g<br>112gm | 121m<br>122g |
| | P | — | — | — | — | | | | |
| Maltose-tryptone | S | 1ig<br>1½ge<br>1ih | 24½fe<br>1ih | 3ba<br>24½ih | 24½fe | 109gm<br>110g<br>109gm<br>112m<br>113g | 122gm<br>112m<br>113g | —<br>122m<br>127g | 122gm |
| | R | 2ge<br>2ec<br>2gc<br>1½ge | 2gc<br>1½ge | 2ic | 1½ie | 90gm<br>90gm<br>90gm<br>109gm | 90gm<br>109gm | 87gm | 106gm |
| | P | — | — | — | — | | | | |
| Hickey-Tresner (modified) | S | 1ig | 1ig | 3ba<br>24½ih | 24½ih | 109gm<br>110g | 109gm<br>110g | —<br>127g | 122m<br>127g |
| | R | 2gc | 2ec | 2gc | 2gc | 90gm | 90gm | 90gm | 90gm |
| | P | — | — | — | — | | | | |
| Yeast extract-malt extract (ISP-2) | S | 24½ih<br>2ih | 24½ih<br>2ih | 24½ih | 24½ih | 122m<br>127g<br>113g | 122m<br>127g<br>113g | 122m<br>127g | 122m<br>127g |
| | R | 2Ie<br>2gc | 2gc<br>2ie | 2Ie | 2gc | 88gm<br>94g<br>90gm | 90gm<br>91gm<br>94g | 88gm<br>94g | 90gm |
| | P | — | — | — | — | | | | |
| Oatmeal (ISP-3) | S | 1ig<br>1½ig | 1ig<br>2fe | 24½fe | 24½ih | 109gm<br>110g<br>— | 109gm<br>110g<br>94g<br>112gm | 122gm | 122gm |
| | R | 1ec<br>1½ge | 1ec<br>2ec | 2ec | 2ec | 121m<br>109gm | 121m<br>90gm | 90gm | 90gm |
| | P | — | — | — | — | | | | |
| Inorganic-salts starch (ISP-4) | S | 24½ih<br>3ih | 24½ih<br>1ih | 24½ih | 24½ih | 122m<br>113g<br>265m | 122m<br>112m<br>113g | 122m | 122m |
| | R | 2ca<br>2gc | 2gc | 2gc | 2ec | 89gm<br>90gm | 90gm | 90gm | 90gm |
| | P | 2ec | 2ec | 2ec | 2ig | 90gm | 90gm | 90gm | 110g<br>112m |
| Glycerol-asparagine (ISP-5) | S | 1ig<br>2ih | a<br>2fe | 3ba<br>24½fe | 1½ig | 109gm<br>110g<br>112m<br>113g | 263gm<br>94g<br>112gm | —<br>122gm | — |
| | R | 1ec<br>2ge | 2gc<br>2ge | 2ge | 2ge | 121m<br>122g<br>94m<br>109gm | 90gm<br>94m<br>109gm | 94m<br>109gm | 94m<br>109gm |
| | P | 2ge | — | — | — | | | | |

[a]S = surface, R = reverse, P = pigment
[b]Chips read from glossy surface
[c]Chip surface: m(matte), g(glossy), gm(glossy or matte)
(1)Jacobson, E., W. C. Granville, and C. E. Foss. 1948. Color harmony manual, 3rd ed. Container Corporation of America, Chicago, Illinois.
(2)Kelly, K. L., and D. B. Judd. 1955. The ISCC-NBS method of designating colors and a dictionary of color names. U.S. Dept. Comm. Circ. 553.

TABLE III

Color Code for Table II

| Color Harmony Manual 3rd ed., 1948[(1)] | | NBS Circular 553, 1955[(2)] | |
|---|---|---|---|
| Color Chip | Color name | Color Chip | Color name |
| a | White | 263gm | White |
| 1ec | Light citron gray, putty | 121m | Pale yellow green |
| | | 122g | Grayish yellow green |
| 1ge | Citron gray | 109gm | Light grayish olive |
| 1ig | Olive gray | 109gm | Light grayish olive |
| | | 110g | Grayish olive |
| 1ih | Olive gray | 112m | Light olive gray |
| | | 113g | Olive gray |
| | | 127g | Grayish olive green |

TABLE III – Continued

Color Code for Table II

| Color Harmony Manual 3rd ed., 1948[1] | | NBS Circular 553, 1955[2] | |
|---|---|---|---|
| Color Chip | Color name | Color Chip | Color name |
| 1li | Light olive drab | 110gm | Grayish olive |
| 1½ca | Cream | 89gm | Pale yellow |
| 1½ec | Biscuit, ecru, oatmeal, sand | 90gm | Grayish yellow |
| | | 93m | Yellowish gray |
| 1½gc | Dusty yellow | 102g | Moderate greenish yellow |
| | | 105gm | Grayish greenish yellow |
| 1½ge | Light olive gray | 109gm | Light grayish olive |
| 1½ie | Light olive | 196gm | Light olive |
| 1½ig | Olive gray | — | — |
| 2ca | Light ivory eggshell | 89gm | Pale yellow |
| 2ea | Light wheat, light maize | 86gm | Light yellow |
| 2cc | Biscuit, ecru, oatmeal, sand | 90gm | Grayish yellow |
| 2fb | Bamboo, buff, straw, wheat | 87g | Moderate yellow |
| | | 89m | Pale yellow |
| 2fe | Covert gray | 94g | Light olive brown |
| | | 122gm | Light olive gray |
| 2gc | Bamboo, chamois | 90gm | Grayish yellow |
| 2ge | Covert tan, griege | 94m | Light olive brown |
| | | 109gm | Light grayish olive |
| 2ic | Honey gold, light gold | 87gm | Moderate yellow |
| 2ie | Light mustard tan | 91gm | Dark grayish yellow |
| | | 94g | Light olive brown |
| | | 106g | Light olive |
| 2ig | Slate tan | 110g | Grayish olive |
| | | 112m | Light olive gray |
| 2ih | Dark covert gray | 112m | Light olive gray |
| | | 113g | Olive gray |
| 2le | Mustard, old gold | 88gm | Dark yellow |
| | | 94g | Light olive brown |
| 3ba | Pearl, shell tint | — | — |
| 3ih | Beige gray, mouse | 113g | Olive gray |
| | | 265m | Medium gray |
| 24½fe | Light mistletoe gray | 122gm | Grayish yellow green |
| 24½ih | Mistletoe gray | 122m | Grayish yellow green |
| | | 127g | Grayish olive green |

[1] Jacobson, E., W. C. Granville, and C. E. Foss. 1948. Color harmony manual, 3rd ed. Container Corporation of America, Chicago, Illinois.
[2] Kelly, K. L., and D. B. Judd. 1955. The ISCC-NBS method of designating colors and a dictionary of color names. U.S. Dept. Comm. Circ. 553.

TABLE IV

Cultural and Biochemical Characteristics of *Streptomyces espinosus* Cultures

| Medium | | NRRL 3890 | NRRL 5729 | NRRL 5730 | NRRL 5731 |
|---|---|---|---|---|---|
| Agar | | | | | |
| Peptone-iron | S | Gray-white to gray-green | Gray-white to gray-green | Trace gray-green-white | Gray-green-white |
| | R | Yellow | Yellow | Yellow | Yellow |
| | O | Melanin negative | Melanin negative | Melanin negative | Melanin negative |
| Calcium malate | S | Fair to good gray-green | Trace gray-green | Trace gray-green | Trace gray-green |
| | R | Pale gray | Pale gray | Pale gray | Pale gray |
| | O | Malate not solubilized | Malate not solubilized | Malate not solubilized | Malate not solubilized |
| Glucose-asparagine | S | Gray-white to gray-yellow | Gray-white to trace green | Fair gray-white | Fair gray-white |
| | R | Light yellow to cream | Cream | Cream | Cream |
| Skim milk | S | White on edge to light gray-green yellow | White on edge to gray-green-pink | White on edge | White on edge |
| | R | Deep yellow to yellow-tan | Yellow-tan | Yellow-tan | Yellow-tan |
| | O | Yellow to yellow-tan pigment | Yellow-tan pigment | Yellow-tan pigment | Yellow-tan pigment |
| | | Casein solubilized under growth to completely | Casein solubilized under growth to completely | Casein solubilized under growth | Casein solubilized under growth |
| Tyrosine | S | Good to heavy gray-green | Good to heavy gray-green | Good gray-green | Good gray-green |
| | R | Red-tan to red-brown | Red-tan to red-brown | Red-tan | Red-tan |
| | O | Red-tan to red-brown pigment | Red-tan to red-brown pigment | Red-tan pigment | Red-tan pigment |
| | | Tyrosine solubilized | Tyrosine solubilized | Tyrosine solubilized | Tyrosine solubilized |
| Xanthine | S | Good gray-green to good only on periphery | Good gray-green | Good gray-green | Good gray-green |
| | R | Pale yellow to cream | Pale yellow-green to cream | Cream | Cream |

TABLE IV – Continued

Cultural and Biochemical Characteristics of *Streptomyces espinosus* Cultures

| Medium | | NRRL 3890 | NRRL 5729 | NRRL 5730 | NRRL 5731 |
|---|---|---|---|---|---|
| Nutrient starch | O | Xanthine not solubilized | Xanthine not solubilized | Xanthine not solubilized | Xanthine not solubilized |
| | S | Good gray-green | Good gray-green | Good gray-green | Good gray-green |
| | R | Cream-olive | Cream-olive | Cream-olive | Cream-olive |
| | O | Starch hydrolyzed | Starch hydrolyzed | Starch hydrolyzed | Starch hydrolyzed |
| Yeast extract-malt extract | S | Good to heavy gray-green | Good gray-green | Good gray-green | Good gray-green |
| | R | Pale yellow-tan to cream-yellow-tan | Cream-yellow-tan | Cream-yellow-tan | Cream-yellow-tan |
| Bennett's | S | Cream to heavy gray-green | Gray-green-white to heavy gray-green | Trace gray-cream | Cream |
| | R | Yellow to olive | Cream to olive | Yellow | Yellow |
| Czapek's sucrose | S | Gray-green | Gray-green | Gray-green | Gray-green |
| | R | Gray-green | Gray-green | Gray-green | Gray-green |
| Maltose-tryptone | S | Heavy gray-green | Good to heavy gray-green | Gray-green-white | Pale gray-green |
| | R | Olive to orange-yellow | Olive to cream | Yellow | Yellow-olive |
| Hickey-Tresner (modified) | S | Heavy gray-green | Heavy gray-green | Gray-green-white | Gray-green |
| | R | Olive-orange | Cream | Deep yellow-tan | Yellow-olive |
| Peptone-yeast extract-iron (ISP-6) | S | Cream to pale pink | Pale pink to gray-green | Cream to pale pink | Cream with trace gray-green to pale pink |
| | O | Melanin negative | Melanin negative | Melanin negative | Melanin negative |
| Tyrosine (ISP-7) | S | Gray-green-white to gray-green | Gray-green-white to gray-green | Gray-green | Gray-green |
| | R | Pale yellow-green to tan | Pale yellow-green to gray-cream | Gray-cream | Gray-cream |
| | O | Melanin-negative | Melanin-negative | Melanin-negative | Melanin-negative |
| Gelatin | | | | | |
| Plain | O | Colorless vegetative growth to gray-white aerial growth liquefaction ½ to complete | Colorless vegetative growth to gray-white aerial growth; liquefaction ½ to complete | Gray-white aerial growth; liquefaction complete | Gray-white aerial growth; liquefaction complete |
| Nutrient | O | White to gray-white aerial growth; liquefaction ⅓ to complete | White to gray-white aerial growth; liquefaction ⅓ to complete | Gray white aerial growth; liquefaction complete | Trace gray-white aerial growth; liquefaction complete |
| Broth | | | | | |
| Synthetic nitrate | O | White to pink-cream aerial growth on surface pellicle; growth throughout medium; nitrate not reduced to nitrite | Trace white to pink-cream aerial growth on surface pellicle; growth throughout medium, nitrate not reduced to nitrite | Trace white aerial growth on surface pellicle; growth throughout medium; nitrate not reduced to nitrite | Trace white aerial growth on surface pellicle; trace growth throughout medium; nitrate not reduced to nitrite |
| Nutrient nitrate | O | Gray-green-white aerial growth on surface pellicle; flocculent bottom growth; nitrate test: neither nitrate nor nitrate present or nitrate not reduced to nitrite | Gray-green-white aerial growth on surface pellicle; flocculent bottom growth; nitrate not reduced to nitrite | Gray-green-white aerial growth on surface pellicle; flocculent bottom growth; nitrate not reduced to nitrite | Trace white aerial growth on surface pellicle; compact to flocculent bottom growth; nitrate not reduced to nitrite |
| Litmus milk | O | Cream to green aerial growth on yellow to tan surface ring; litmus reduced; peptonization; pH 7.3 | Pink-tan to gray-green aerial growth on surface ring; litmus reduced; peptonization; pH 7.3 | Tan aerial growth on surface ring; litmus reduced; peptonization; pH 7.3 | Green-white aerial growth on surface ring; partial reduction; partial peptonization; pH 7.1 | aS = surface, R = reverse, P = pigment, O = other characteristics

TABLE V

Utilization of Carbon Compounds by *Streptomyces espinosus* Cultures In the Synthetic Medium of Pridham and Gottlieb[1]

| | NRRL 3890 | NRRL 5729 | NRRL 5730 | NRRL 5731 |
|---|---|---|---|---|
| CONTROL | (+)* | (−)* | (+) | (+) |
| 1. D-Xylose | + | + | + | + |
| 2. L-Arabinose | + | + | + | + |
| 3. Rhamnose | + | + | + | + |
| 4. D-Fructose | + | (+),+ | + | + |
| 5. D-Galactose | + | + | + | + |
| 6. D-Glucose | + | + | + | + |
| 7. D-Mannose | + | + | + | + |
| 8. Maltose | + | + | + | + |
| 9. Sucrose | (+) | (−), (+) | (+) | (+) |
| 10. Lactose | + | + | + | + |
| 11. Cellobiose | + | + | + | + |
| 12. Raffinose | (+) | (−) | (+) | (+) |
| 13. Dextrin | + | + | + | + |
| 14. Inulin | (+),(−) | (−) | (+) | (+) |
| 15. Soluble starch | + | + | + | + |
| 16. Glycerol | + | + | + | + |
| 17. Ducitol | (+),(−) | (−) | (+) | (+) |
| 18. D-Mannitol | + | + | + | + |
| 19. D-Sorbitol | +,(−) | (−) | + | + |
| 20. Inositol | + | (+) | + | + |
| 21. Salicin | (+) | (+) | + | (+) |
| 22. Phenol | (+),(−) | (−) | (+) | (+) |
| 23. Cresol | − | − | − | − |
| 24. Na Formate | (+),− | (−),− | (+) | (+) |
| 25. Na Oxalate | (+),(−) | (+),(−) | (+) | (+) |
| 26. Na Tartrate | (+),(−) | (−),− | (+) | (+) |
| 27. Na Salicylate | − | − | − | − |
| 28. Na Acetate | (+) | (+) | (+) | (+) |
| 29. Na Citrate | + | (+) | + | (+) |
| 30. Na Succinate | (+),(−) | (−) | (+) | (+) |

[1]Pridham, T. G., and D. Gottlieb. 1948. The utilization of carbon compounds by some Actinomycetales as an aid for species determination. J. Bacteriol. 56:107–114.

+ = Good utilization  
(+)= Poor utilization  
(−)= Doubtful utilization  
− = No growth

*Results from different studies

TABLE VI

Utilization of Carbon Compounds by *Streptomyces espinosus* Cultures In the Synthetic Medium of Shirling and Gottlieb[1]

| | NRRL 3890 | NRRL 5729 | NRRL 5730 | NRRL 5731 |
|---|---|---|---|---|
| CONTROL | | | | |
| Negative-basal medium | ±* | −,±* | ± | ± |
| Positive-basal medium plus D-glucose | + | + | + | + |
| Carbon compounds | | | | |
| L-Arabinose | ±,++ | ±,+ | ± | ± |
| Sucrose | − | ±,− | − | − |
| D-Xylose | ++ | ±,++ | ++ | ++ |
| Inositol | ++ | ±,+ | ++ | ++ |
| D-Mannitol | ++ | ++ | ++ | ++ |
| D-Fructose | ++ | ±,+ | ++ | ++ |
| Rhamnose | ++ | ++ | ++ | ++ |
| Raffinose | − | − | − | − |
| Cellulose | ±,++ | ±,− | + | + |

[1]Shirling, E. B., and D. Gottlieb. 1966. Methods for characterization of *Streptomyces* species. Int. J. Syst. Bacteriol. 16:313:–340.

++ Strong utilization  
+ Positive utilization  
± Utilization doubtful  
Utilization negative  
* Results from different studies Lincomycin is produced by the novel microorganisms of the subject invention when said microorganisms are grown in an aqueous nutrient medium under submerged aerobic conditions. It is to be understood also that for the preparation of limited amounts surface cultures and bottles can be employed. The organisms are grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers's solids, animal peptone liquors, fishmeal, meat and bone scraps, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of lincomycin by the process of the invention can be effected, advantageously, at a temperature of about 44°–48° C., and preferably at about 45° C. Ordinarily, optimum production of lincomycin is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganisms for inoculation to avoid a pronounced lag in the production of lincomycin and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of lincomycin, as long as it is such that a good growth of the microorganisms is obtained.

The lincomycin produced by the subject process can be recovered by the procedure disclosed in U.S. Pat. No. 3,086,912.

In preferred recovery process, lincomycin is recovered from its culture medium by separation of the mycelia and undissolved solids by conventional means, such as by filtration and centrifugation. Lincomycin is then recovered from the filtered or centrifuged broth by passing said broth over a resin which comprises a non-ionic macro porous copolymer of styrene crosslinked with divinylbenzene. Resins of this type are disclosed in U.S. Pat. No. 3,515,717. Exemplary of this type of resin is Amberlite XAD-2. Lincomycin is eluted from the resin with a solvent system consisting of methanol water (95:5 v/v). Bioactive eluate fractions are determined by a standard microbiological disc plate assay using the microorganism Sarcina lutea. Biologically active fractions are combined, concentrated to an aqueous solution which is then freeze dried. The freeze dried material is then triturated with methylene chloride. The methylene chloride extract is concentrated to dryness and the residue triturated with acetone. The filtrate is mixed with ether to give a precipitate which is separated. The remaining filtrate is mixed with methanolic hydrogen chloride (1 N) to precipitate colorless lincomycin hydrochloride. This precipitate is isolated by filtration and crystallized from water-acetone to give crystalline lincomycin hydrochloride.

It is to be understood that the process of the subject invention is not limited to the particular microorganisms fully described by the cultural characteristics disclosed herein. It is intended that this invention also include other strains or mutants of the said microorganisms which can be produced by procedures well known in the art, for example, by subjecting the novel microorganisms to x-ray or ultraviolet radiation, nitrogen mustard, phage exposure, and the like.

Hereinafter is described a non-limiting example of the process of the present invention. All percentages are by weight and all solvent portion mixtures are by volume unless otherwise noted.

Part A. FERMENTATION

A soil slant of Streptomyces espinosus, NRRL 3890, is used to inoculate a 500-ml. Erlenmeyer flask containing 100-ml. of sterile seed medium consisting of the following ingredients:

| | |
|---|---|
| Glucose monohydrate | 25 g./liter |
| Pharmamedia* | 25 g./liter |
| Tap water q.s. | Balance |
| Presterilization pH = 7.2 | |

*Pharmamedia is an industrial grade of cottonseed flour produced by Traders Oil Mill Company, Fort Worth, Texas.

The flasks are grown for 3 days at 28° C., on a rotary shaker.

Seed inoculum, described above, is used to inoculate a series of 500-ml. Erlenmeyer fermentation flasks containing 100-ml. of sterile medium consisting of the following ingredients:

| | |
|---|---|
| Kaysoy* | 35 gm./liter |
| Skim milk | 10 gm./liter |
| Czapek Dox broth** | 10 gm./liter |
| CaCO$_3$ | 3 gm./liter |
| Ucon LB-625*** | 20 ml./liter |
| Presterilization pH = 7.2 | |

*Finely milled fat extracted soybean meal supplied by Archer Daniels Midland Company, 733 Marquette Avenue, Minneapolis, Minnesota.
**Supplied by Difco Laboratories, Detroit, Michigan.
***A polyalkylene glycol defoaming fluid supplied by Union Carbide Corp., Chemicals Division, 10421 W. 7 Mile Road, Detroit, Michigan 48221.

Each flask is inoculated with 5 ml. of seed inoculum per 100 ml. of fermentation medium. Some of the flasks are incubated at 28° C. and other at 45° C. on a rotary shaker operating at 250 rpm and an eccentricity of 2.5 inches.

The process described above for S. espinosus, NRRL 3890, is repeated for the biotypes, described herein. The results of these fermentations are as shown in Table A, Supra.

Part B. RECOVERY

Whole fermentation broth (approximately 4 liters) obtained as described above, is filtered using diatomaceous earth as a filter aid. The filter cake is washed with 1 liter of water and the aqueous wash is combined with the filtrate. The resulting solution is kept as "clear beer." The filter cake is triturated twice with 700 ml. of methanol each time. Methanolic extract is kept as "MEOH extract." The clear beer is passed over a column containing 250 ml. of Amberlite XAD-2 at a flow rate of 25 ml. per minute. The spent beer is kept as one fraction (spent). The column is then washed with 500 ml. of water. The aqueous wash is kept as one fraction (wash). The column is then eluted with 95 percent aqueous methanol. Fractions of 20 ml. are collected. Results (testing against sensitive S. lutea) follow:

| | Zone (mm) |
|---|---|
| Clear Beer | 38 |
| Spent | 19 |
| Wash | 20 |
| Fraction No. | |
| 2 | 16 |
| 4 | 14 |
| 5 | 14.5 |
| 6 | 36 |
| 7 | 49 |
| 8 | 51 |
| 9 | 52 |
| 10 | 51 |
| 12 | 47 |
| 14 | 43 |
| 16 | 40 |
| 19 | 37 |
| 20 | 34 |
| 25 | 35 |
| 30 | 29 |
| 35 | 30 |
| 40 | 27 |
| 45 | 26 |
| 50 | 24 |
| 55 | 28 |
| 60 | 24 |
| 65 | 19 |
| 70 | 11 |
| 75 | — |
| 80 | 11.5 |
| 85 | traces |
| 90 | traces |
| 95 | 0 |
| 100 | 10 |

Fractions 6–60 are combined. The solution is concentrated to dryness to give 3.5 gms. of a lincomycin preparation assaying 310 mcg. of lincomycin/mg. This material is then triturated with methylene chloride. The methylene chloride extract is concentrated to dryness and the residue triturated with acetone. The filtrate is mixed with ether to give a precipitate which is separated. The remaining filtrate is mixed with methanolic hydrogen chloride (1 N) to precipitate colorless lincomycin hydrochloride. This precipitate is isolated by filtration and crystallized from water-acetone to give crystalline lincomycin hydrochloride.

We claim:

1. A novel process for preparing the antibiotic lincomycin which comprises cultivating Streptomyces espinosus, having the identifying characteristics of NRRL 3890, and mutants thereof, in an aqueous nutrient medium under aerobic conditions at an incubation temperature range of about 44°–48° C. until substantial antibiotic activity is imparted to said medium by the production of lincomycin.

2. A novel process for preparing the antibiotic lincomycin which comprises cultivating *Streptomyces espinosus*, biotype 21987a, having the identifying characteristic of NRRL 5729, and mutants thereof, in an aqueous nutrient medium under aerobic conditions at an incubation temperature range of about 44°–48° C. until substantial antibiotic activity is imparted to said medium by the production of lincomycin.

3. A novel process for preparing the antibiotic lincomycin which comprises cultivating *Streptomyces espinosus*, biotype 22061a, having the identifying characteristic of NRRL 5730, and mutants thereof, in an aqueous nutrient medium under aerobic conditions at an incubation temperature range of about 44°–48° C. until substantial antibiotic activity is imparted to said medium by the production of lincomycin.

4. A novel process for preparing the antibiotic lincomycin which comprises cultivating *Streptomyces espinosus*, biotype 22149a, having the identifying characteristic of NRRL 5731 and mutants thereof, in an aqueous nutrient medium under aerobic conditions at an incubation temperature range of about 44°–48° C. until substantial antibiotic activity is imparted to said medium by the production of lincomycin.

5. A process according to claim 1, wherein the fermentation incubation temperature is about 45° c.

6. A process according to claim 2, wherein the fermentation incubation temperature is about 45° C.

7. A process according to claim 3, wherein the fermentation incubation temperature is about 45° C.

8. A process according to claim 4, wherein the fermentation incubation temperature is about 45° C.

* * * * *